United States Patent
Van Phan et al.

(10) Patent No.: US 10,973,071 B2
(45) Date of Patent: Apr. 6, 2021

(54) IMPROVING COMMUNICATION RELIABILITY

(71) Applicant: Nokia Solutions and Networks Oy, Espoo (FI)

(72) Inventors: Vinh Van Phan, Oulu (FI); Zexian Li, Espoo (FI); Ling Yu, Kauniainen (FI); David Navratil, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/498,485

(22) PCT Filed: May 2, 2017

(86) PCT No.: PCT/FI2017/050334
§ 371 (c)(1),
(2) Date: Sep. 27, 2019

(87) PCT Pub. No.: WO2018/202933
PCT Pub. Date: Nov. 8, 2018

(65) Prior Publication Data
US 2020/0107386 A1 Apr. 2, 2020

(51) Int. Cl.
*H04W 76/16* (2018.01)
*H04W 28/02* (2009.01)
*H04W 28/18* (2009.01)

(52) U.S. Cl.
CPC ....... *H04W 76/16* (2018.02); *H04W 28/0215* (2013.01); *H04W 28/0236* (2013.01); *H04W 28/18* (2013.01)

(58) Field of Classification Search
CPC .......... H04B 1/74; H04L 1/0007; H04L 1/08; H04L 1/1893; H04L 1/22; H04W 16/14;
(Continued)

(56) References Cited

U.S. PATENT DOCUMENTS 9,794,870 B2 * 10/2017 Vannithamby ........ H04W 48/18
2012/0289170 A1 11/2012 Li et al.
(Continued)

FOREIGN PATENT DOCUMENTS

GB 2542614 A 3/2017
WO 2012/171587 A1 12/2012
(Continued)

OTHER PUBLICATIONS

"Packet Duplication Across Legs", 3GPP TSG-RAN WG2 Meeting #96, R2-167947, Agenda : 9.2.1.1, CATT, Nov. 14-18, 2016, pp. 1-2.
(Continued)

*Primary Examiner* — Kan Yuen
(74) *Attorney, Agent, or Firm* — Nokia Technologies Oy

(57) ABSTRACT

There is provided a method, comprising: at least partially controlling, by a network node, transmissions in a plural of radio access technologies, RATs, each RAT being capable of providing at least one communication link to a same user equipment; deciding to transmit a packet to the user equipment at least via a first RAT; requesting a transmission of the packet additionally via at least one other RAT; determining capability information corresponding to the requested transmission of the packet via the at least one other RAT; determining transmission setup for the packet to be transmitted via the first RAT based on the capability information, wherein the transmission set-up defines at least the number of transmissions to be performed for the packet by the first RAT; and instructing the transmission of the packet via the first RAT according to the determined transmission level.

20 Claims, 7 Drawing Sheets

(58) Field of Classification Search
CPC ......... H04W 28/0215; H04W 28/0236; H04W 28/18; H04W 36/28; H04W 76/16; H04W 88/06; H04W 88/10; H04W 88/12
See application file for complete search history.

(56) References Cited

U.S. PATENT DOCUMENTS

| | | | |
|---|---|---|---|
| 2013/0095806 | A1 | 4/2013 | Salkintzis et al. |
| 2015/0029998 | A1 | 1/2015 | Sayenko et al. |
| 2015/0350953 | A1 | 12/2015 | Himayat et al. |
| 2016/0338074 | A1 | 11/2016 | Chou et al. |
| 2018/0332465 | A1* | 11/2018 | Lindoff ................ H04W 72/08 |

FOREIGN PATENT DOCUMENTS

| | | |
|---|---|---|
| WO | 2013/126859 A2 | 8/2013 |
| WO | 2016/128611 A1 | 8/2016 |
| WO | 2016/180925 A1 | 11/2016 |
| WO | 2017/019240 A1 | 2/2017 |

OTHER PUBLICATIONS

Wiethölter, "Support of Resource-Aware Vertical Handovers in WLAN Hotspots", Thesis, May 21, 2014, 244 pages.

"3rd Generation Partnership Project; Technical Specification Group Radio Access Network; Study on Scenarios and Requirements for Next Generation Access Technologies; (Release 14)", 3GPP TR 38.913, V14.1.0, Dec. 2016, pp. 1-38.

"Revised Work Item on Shortened TTI and Processing Time for LTE", 3GPP TSG RAN Meeting #74, RP-162014, Agenda : 10.11.1, Ericsson, Dec. 5-8, 2016, 8 pages.

"Chairman's Notes of AI 7.2.5 Shortened TTI and Processing Time for LTE", 3GPP TSG RAN WG1 Meeting #88, R1-1703977, Ad-Hoc chair (Ericsson), Feb. 13-17, 2017, 9 pages.

"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.1.0, Dec. 2016, pp. 1-317.

"3rd Generation Partnership Project; Technical Specification Group Radio Access Network; Evolved Universal Terrestrial Radio Access Network (E-UTRAN) and Wireless LAN (WLAN); Xw application protocol (XwAP) (Release 14)", 3GPP TS 36.463, V14.0.0, Dec. 2016, pp. 1-94.

International Search Report and Written Opinion received for corresponding Patent Cooperation Treaty Application No. PCT/FI2017/050334, dated Aug. 23, 2017, 17 pages.

"Support for Ultra-reliable Low Latency Communication (URLLC)", 3GPP TSG-RAN2 Meeting #95, R2-165447, Agenda : 9.2, Huawei, Aug. 22-26, 2016, 3 pages.

Extended European Search Report received for corresponding European Patent Application No. 17908208.6, dated Dec. 10, 2020, 12 pages.

"Considerations on Packet Duplication for URLLC", 3GPP TSG-RAN WG2 Meeting #97, R2-1701986, Agenda item: 10.2.1.2, Samsung, Feb. 13-17, 2017, 4 pages.

"Packet Duplication for URLLC", 3GPP TSG-RAN WG2 Meeting #96, R2-168845, Agenda item: 9.2.1.2, Samsung, Nov. 14-18, 2016, 6 pages.

* cited by examiner

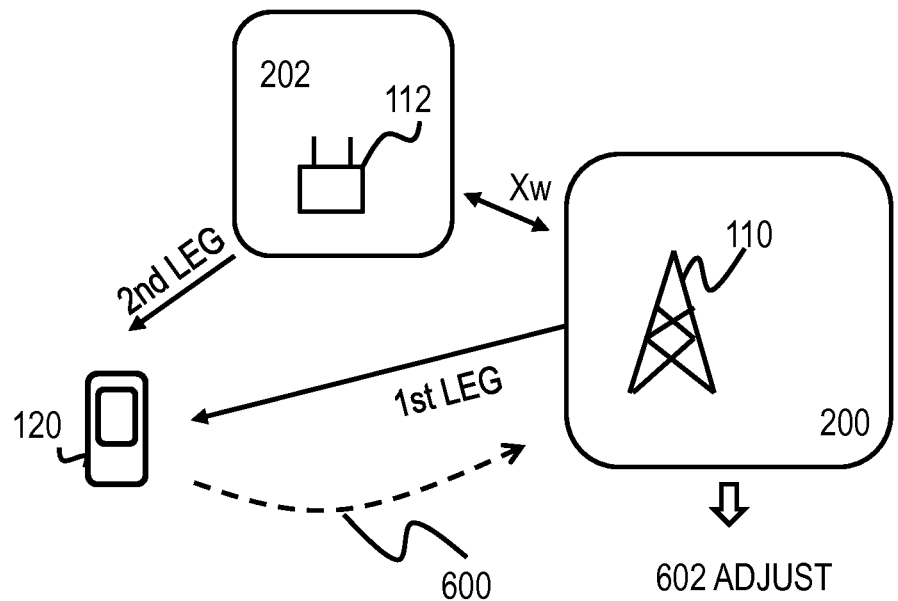

FIG. 6

```
900 DETERMINING, BY A NETWORK NODE ASSOCIATED WITH
A SECOND RAT, THAT THE SECOND RAT IS MOMENTARILY UNSUITABLE
FOR TRANSMISSION OF A PACKET TO A USER EQUIPMENT, WHEREIN
THE SECOND RAT CO-OPERATES WITH A FIRST RAT IN A MULTI-RAT
MULTI-CONNECTIVITY FOR TRANSMISSION OF THE PACKET
```

```
902 TRANSMITTING THE MOMENTARY UNSUITABILITY
INDICATION TO A NETWORK NODE CONTROLLING
TRANSMISSIONS IN A PLURAL OF RATS
```

FIG. 9

IMPROVING COMMUNICATION RELIABILITY

RELATED APPLICATION

This application was originally filed as Patent Cooperation Treaty Application No. PCT/FI2017/050334 filed on May 2, 2017.

FIELD OF THE INVENTION

The invention relates generally to reliable communications with low latency, such as ultra-reliable and low latency communications (URLLC).

BACKGROUND

Latency and reliability play important roles when setting requirements in future of mobile communications. One communications type with tight requirements is URLLC. There is a need to improve existing communication techniques in order to reach these requirements.

BRIEF DESCRIPTION OF THE INVENTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

LIST OF THE DRAWINGS

In the following, the invention will be described in greater detail with reference to the embodiments and the accompanying drawings, in which FIG. 1 presents a communication network, according to an embodiment;

FIG. 6 depicts a feedback from a user equipment, according to some embodiments;

FIG. 9 shows a method, according to an embodiment; and

DESCRIPTION OF EMBODIMENTS

Figure 1:
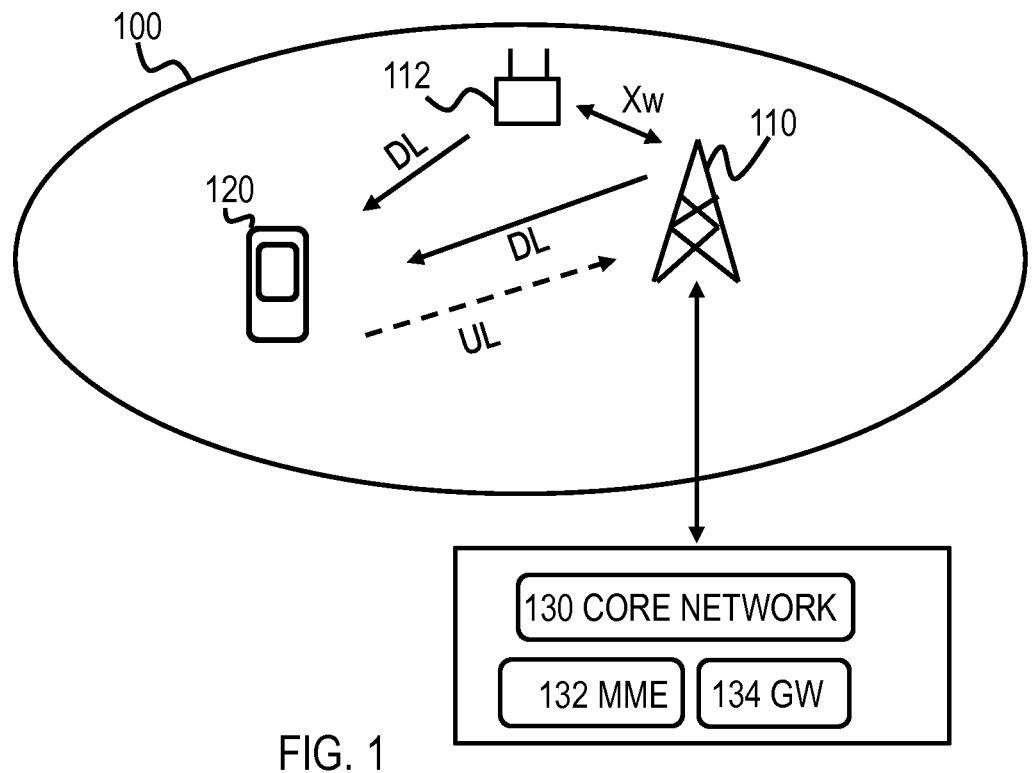

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, LTE-Advanced Pro and/or 5G system. The LTE-Advanced Pro system, may become part of 3GPP LTE Rel-14/15.

The embodiments are not, however, restricted to the system given as an example but a person skilled in the art may apply the solution to other communication systems provided with necessary properties. One example of a suitable communications system is the 5G system, as listed above. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability).

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system to which embodiments of the invention may be applied. The system may comprise a control node 110 providing a cell 100. Each cell may be, e.g., a macro cell, a micro cell, femto, or a pico cell, for example. In another point of view, the cell may define a coverage area or a service area of the access node 110. The control node 110 may be an evolved Node B (eNB) as in the LTE and LTE-A, or any other apparatus capable of controlling radio communication and managing radio resources within a cell. For 5G solutions, the implementation may be similar to LTE-A, as described above. The control node 110 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the eNB 110 to the UE 120 and uplink (UL) communication from the UE 120 to the eNB 110. Additionally, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. In FIG. 1, WLAN access node/point is depicted with a reference numeral 112. Other communication methods between the access nodes may also be possible. The access node 110 may be further connected via another interface to a core network 130 of the cellular communication system. The LTE specifications specify the core network as an evolved packet core (EPC), and the core network may comprise a mobility management entity (MME) 132 and a gateway node 134. The MME may handle mobility of terminal devices in a tracking area encompassing a plurality of cells and also handle signalling connections between the terminal devices and the core network 130. The gateway node 134 may handle data routing in the core network 130 and to/from the terminal devices.

In an embodiment, the control node 110 may control a plurality of spatially separated access points/nodes (APs/ANs) acting as transmit/receive (Tx/Rx) nodes. The access nodes may comprise e.g. a medium access control (MAC) layer and a physical (PHY) layer, whereas the "central" control node comprises the layers above MAC layer, such as a radio link control (RLC) layer, a packet data convergence protocol (PDCP) layer, a radio resource control (RRC) and an internet protocol (IP) layers. It is considered that skilled person is familiar with the OSI model and the functionalities within each layer. In connection of FIG. 1, one alternative implementation option is thus that the node 110 is the "central" control node controlling a plurality of Tx/Rx nodes (not depicted in Figure). Such network may provide diversity combining techniques which are based on parallel or simultaneous multi-channel or multi-connectivity radio transmissions within required delay constraint. These may be effective for providing required communication requirements. That is, a data packet may be transmitted between the UE 120 and a number of different access points acting as the Tx/Rx nodes in a coordinated and controlled way. These kind of schemes can be facilitated with a flexible and adaptable radio access network (RAN) level multi-connectivity (MC), in which the UE may be provided with more than one active radio connections served by more than one APs simultaneously.

As said, URLLC may impose strict requirements to communications. E.g. the target for user plane latency may be 0.5 ms for UL, and 0.5 ms for DL. Furthermore, if possible, the latency should also be low enough to support the use of the next generation access technologies as a wireless transport technology that can be used within the next generation access architecture. Reliability can be evaluated by the success probability of transmitting certain amount of data within a certain delay window, which is the time it takes to deliver a small data packet from for example radio protocol layer 2/3 service data units (SDU) ingress point to the radio protocol layer 2/3 SDU egress point of the radio interface, at a certain channel quality (e.g., coverage-edge). The delay window can be defined based on application layer E2E delay as well. An example general URLLC reliability requirement for one transmission of a packet may be $1-10^{-5}$ for 32 bytes with a user plane latency of 1 ms.

In order to reach the latency requirements of e.g. the URLLC (e.g. radio transmissions within required delay constraint of as low as less than half of a millisecond), it has been proposed that packet duplication shall be supported at the packet data convergence protocol (PDCP). The PDCP is a layer and it is located in the radio protocol stack in the UMTS and LTE Air interface on top of the radio link control (RLC) layer, the medium access control (MAC) layer and the physical (PHY) layer, and below the radio resource control (RRC) on control-plane and the internet protocol (IP) layers on user-plane. However, it needs to be noted that packet duplication consumes more radio resources and, most of the time, when the first transmission gets through successfully, the packet duplication means a waste of radio resources. This, when it comes to wasting licensed spectrum resources, is rather expensive to the operator as well as to the end user and therefore needs to be kept down as much as possible. In this regard, it is proposed to utilize some suitable non-3GPP RAT, such as IEEE 802.11 (wireless local area network, WLAN, WiFi) operating in unlicensed spectrum but cellular-integrated mode, for the possible packet duplication. This may be referred to as multi-RAT multi-connectivity (MC). However, it should be noted that this application is not limited to the IEEE 802.11 as one of the RATs, but any suitable RAT operating over unlicensed or license-exempt radio spectrum may be considered including RAT(s) from 3GPP as well.

One open issue is how to enable and facilitate effective PDCP duplication over other RAT, such as 802.11 leg in connection of MC of the UE. Some working assumptions behind this application are at least one of the following observations or considerations:

Expectable suitable RATs for URLLC include 3GPP Rel'15 and beyond 5G (transmission time interval (TTI) of a mini-slot can be lower than 0.1 ms), LTE (shorter-TTI is 2/7 OFDM symbols (OS)), and IEEE 802.11. The packet transmission time of IEEE 802.11 with suitable versions and data rates varies comparably between LTE shorter-TTI and 5G mini-slot TTI, depending on the packet size.

Required end-to-end (E2E) latency of URLLC may be close to the TTI range of involved RATs and therefore strict inter-layer timing on packet duplication over multi-RAT MC needs to be considered.

Quality-of-service (QoS) support and multi-user multiplexing support of IEEE 802.11 may be rather limited.

3GPP RAT may be control and should be able to support URLLC with or without availability of other non-3GPP RAT such as IEEE 802.11.

RLC unacknowledged mode (UM) or transparent mode (TM) is applied for radio bearers (RB) of URLLC, as URLLC is typically of small-data transmissions and not able to afford conventional retransmission on RLC or on higher layer between the UE and the serving RAN/RAT, due to excessive round trip times (RTTs).

Figure 2:
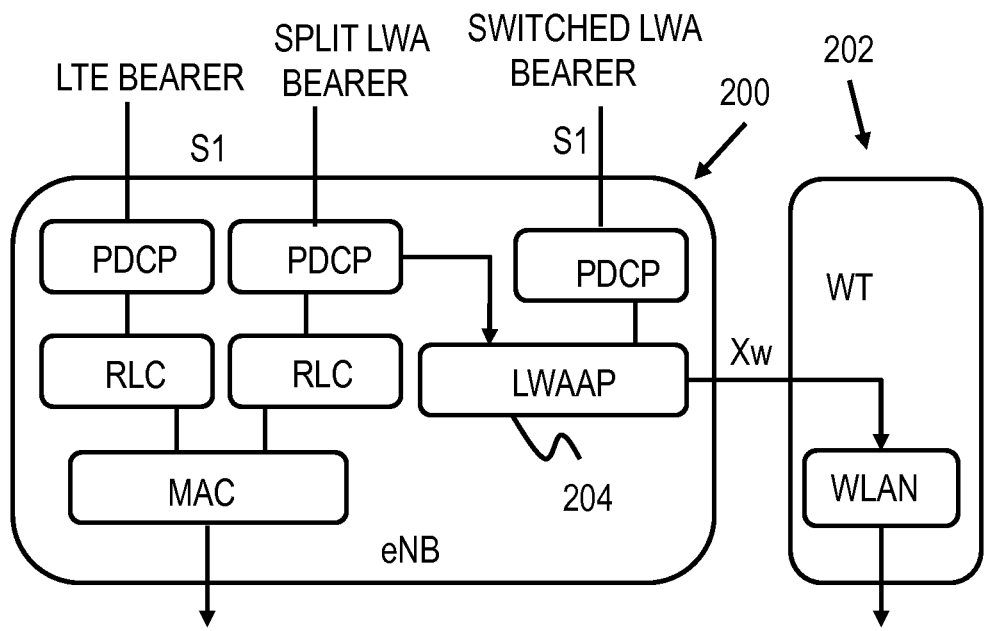
FIG. 2 shows how bearers may be used in a LTE-WLAN multi-connectivity scenario, according to an embodiment.

RAN level integrated LTE-802.11 dual connectivity (DC) has been studied and standardized under the so-called LTE-WLAN aggregation (LWA). FIG. 2 shows an overview of the LWA Radio Protocol Architecture for collocated scenario and for non-collocated scenario (FIG. 2), where cellular RAT 200 (e.g. LTE) and non-cellular RAT 202 (e.g. WLAN) co-operate. In LWA, the radio protocol architecture that a particular bearer uses depends on the LWA backhaul scenario and how the bearer is set up. Two bearer types exist for LWA: split LWA bearer and switched LWA bearer. Those two bearer types are depicted in FIG. 2, for the non-collocated scenario. The collocated scenario is similar as non-collocated, except that WLAN transmission unit may be located in the eNB. For PDUs sent over WLAN in LWA operation, an LTE-WLAN Aggregation Adaptation Protocol (LWAAP) entity 204 generates LWAAP packet data unit (PDU) containing a data radio bearer (DRB) identity and a WT uses the LWA for forwarding the data to the UE over WLAN. The termination point of the Xw interface at WLAN is a logical node, called WT (WLAN Termination), and it can be implemented at an access point, access controller, or another physical entity. The UE uses the LWA to determine that the received PDU belongs to an LWA bearer and uses the DRB identity to determine to which LWA bearer the PDU belongs to. In downlink, the PDCP sublayer of the UE supports in-sequence delivery of upper layer PDUs based on the reordering procedure introduced for the DC. In uplink, PDCP PDUs may be sent via the LTE. The interface between LTE and WLAN may be called Xw. The WT side may provide some functions, such as WT configuration update, and WLAN status reporting.

LWA is still for mobile broadband (MBB) services and, hence, there is no critical need for PDCP as well as LWAAP, i.e. an adaptation layer (AL), to be aware of the other RAT and tightly control transmission over the other RAT (except for conventional radio bearer offloading or splitting, but not duplication and routing). Therefore, LWA has not been proposed for URLLC earlier. In order to satisfy the tight requirements for URLLC, the embodiments focus on cellular-integrated multi-RAT MC for URLLC support, particularly MC with IEEE 802.11 as the other RAT, as a non-limiting example.

Figure 3:
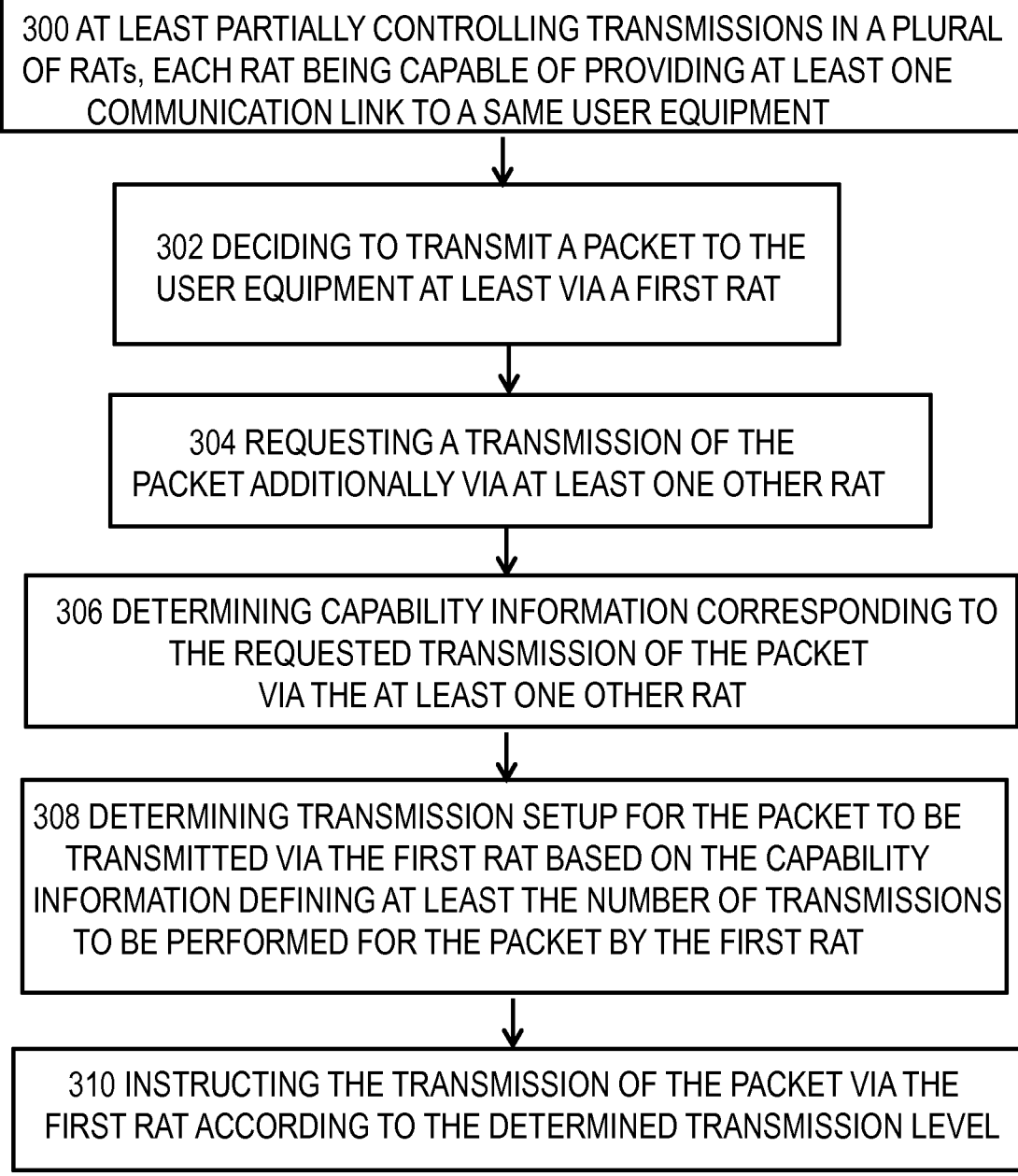
FIG. 3 shows a method, according to an embodiment.

FIG. 3 depicts a method which may be performed by a network node, such as the control node 110. As will be described in detail below, an idea is to explore and utilize lower-layer capabilities in addition to a capacity of other RAT, e.g. an unlicensed spectrum RAT, such as IEEE 802.11 (also known as WLAN/WiFi), for PDCP level packet duplication. Packet duplication may be important for the reliability of packet reception by the UE. An assumption is that the network provides multi-RAT multi-connectivity in order to support URLLC for the UE 120. In multi-RAT multi-connectivity, UE maintains multiple active connections with at least one controlling RAT and one other RAT. Each connection may be referred to as a leg in the description. Therefore, a packet and possibly packet duplicates can be sent between PDCP peer entities in UE and the controlling RAT over multiple legs, such as the two DL legs in FIG. 1.

In step 300, the network node may at least partially control transmissions in many RATs, each RAT being capable of providing at least one communication link to a same UE, such as the UE 120. In one embodiment, the network node controlling the RATs may be an entity of a first RAT. For example, the network node may comprise a packet data convergence protocol (PDCP) layer of the first RAT. Thus, the cellular network, such as 5G or LTE acting as the first RAT, may control the multi-RAT multi-connectivity for supporting URLLC for the UE 120. In another embodiment, the controlling network node may not be an entity of the first RAT, but e.g. a cloud based element which is external to the RATs but still in control of at least some of the transmission in the RATs. In one embodiment, the network node may comprise the PDCP entity of the corresponding URLLC radio bearer (RB) and is in control of PDCP packet duplication including scheduling duplicated packets over different legs of multi-RAT connection. For sake of simplicity let's assume that the control/network node 110 comprises the PDCP entity and is the entity performing the method of FIG. 3.

In step 302, the node 110 may decide to transmit a packet to the UE 120 at least via the first RAT 200. As said, in an embodiment, the first RAT is a cellular RAT, such as LTE or 5G, for example.

In step 304, the node 110 may request a transmission of the packet additionally via at least one other RAT 202, such as an unlicensed spectrum RAT. One non-limiting example of such a RAT is a wireless local area network according to IEEE 802.11. In FIG. 1 this is shown with reference numeral 112, depicting the access node of the WLAN RAT 202. In one embodiment, the requesting may comprise sending the packet to the at least one other RAT 202 for transmission to the UE 120. In one embodiment, the request may define that the packet is to be handled and transmitted according to the URLLC requirements. In other words, some high level requirements may be imposed to the second RAT 202 in the request. In one embodiment, the first RAT 200 does not impose detailed requirements for the transmission to be performed by the WLAN 202, i.e. the WLAN itself determines the transmission characteristics (e.g. modulation and coding scheme) and the first RAT 200 need not be aware of such detailed transmission characteristics.

In step 306, the node 110 may determine capability information corresponding to the requested transmission of the packet via the at least one other RAT. The determination may in an embodiment involve receiving the capability information from the at least one other RAT. In another embodiment, the node 110 may itself determine the capability information based on e.g. in lack of receiving any information. In other words, the node 110 may detect that no capability information is received from the at least one other RAT 202. Then the node 110 may consider, based on the detection, that the at least one other RAT 202 is/was capable of performing the transmission of the packet to the user equipment as requested (e.g. by fulfilling the requirements of the URLLC). The capability information will be discussed in more details below.

In step 308, the node 110 may determine a transmission setup for the packet to be transmitted via the first RAT 200 at least partially based on the capability information of the other RAT. In an embodiment, capability of the first RAT 200 may affect the transmission setup of the first RAT 200 as well. The transmission setup defines at least the number of transmissions to be performed for the packet by the first RAT 200. The transmission setup may also be called a transmission level. In some cases a single transmission from first RAT 200 may suffice, whereas in other cases diversity transmission from the first RAT 200 is appropriate, as will be described.

Finally, in step 310, the node 110 may instruct the transmission of the packet via the first RAT 200 according to the determined transmission level. In one embodiment, where the node 110 comprises at least the PDCP layer of the first RAT, the instructing may comprise commanding the MAC layer and/or the PHY layer of the first RAT 200 to apply the determined transmission setup. For example, the PDCP performing the packet duplication, indicates the lower layers of at least the leg of the controlling RAT (e.g. the first RAT 200) and the determined transmission setup. This may include instructing one or more Tx/Rx access nodes to perform the transmission.

The method shown in FIG. 3 may address the problem of how to ensure that the packet is transmitted to the UE 120 according to the ultra-reliable-low-latency-communications, URLLC, requirements. In one embodiment, the proposal may apply packet-by-packet operation (in a dynamic fashion). E.g. the steps 302-310 may be performed separately for each packet. In alternative embodiment, the proposal may operate on packet groups comprising more than one packet. In one embodiment, the proposal operates at a bearer level, e.g. bearer-by-bearer.

Let us now take a closer look at some of the functions of FIG. 1. As said in connection of step 304, the node 110 may determine capability information. In one embodiment, the capability information may include semi-static information, such as e.g., 802.11 version, maximum bit rates, QoS support capability, etc. However, the first RAT 200 may also/alternatively receive/determine capability information when requesting the packet transmission from the other RAT 202, as shown in step 306 of FIG. 3. This capability information may have dynamic nature, which may vary packet-per-packet. So there may be many kinds of capability information and the first RAT 200 may receive and/or determine such at several instances, as shown later with respect to FIGS. 7 and 8, for example.

In one embodiment, the capability information indicates information regarding at least one of the following: timing, reliability, capacity, load, momentary suitability status of the at least one other RAT 202. It should be further noted that transmission time interval (TTI), as specified by 3GPP, may not be applicable for non-3GPP RATs (such as the WLAN) and hence a more general term of packet transmission time, coupled with other information describing the characteristics of packet transmission time as a random variable, is proposed. This may allow a unified mechanism for PDCP duplication over 3GPP and non-3GPP RATs.

The timing and reliability information may include a set of values of expected packet transmission time and other information about the expected packet transmission time such as variance, confidence interval or cumulative distribution function, to mention only a few non-limiting examples. As indicated earlier, URLLC supports strict timing (and processing) across all the involved layers/entities. E.g. PDCP at the central unit 110 may have its own timing, following the clock of the central unit and time granularity defined for the PDCP. Then, WLAN 202 may have its own timing and MAC/PHY in distributed units may have another timing or timing granularity. These all needs to be aligned/ compensated for when transmitting according to URLLC requirements. Timing at a PDCP level may refer to a) a timing of events (i.e. to ensure that a task such as transmission of data to the other RAT 202 occurs at a given time) or b) processing time (i.e. a knowledge about time required to complete a task (i.e. compose PDU and submit it for transmission), or both. In case all nodes involved and entities thereof share the same synch clock, then timing is the same for all. However, in case the nodes do not share the same synch clock or e.g. different RATs may use different numerology in time division in layers 1/2 (L1/L2), there may be a need for timing alignment. As an example, if the first RAT 200 uses a time slot of 0.1 ms and the other RAT 202 uses a time slot of 0.15 ms, then the first RAT 200 should know and take the difference into account when sending its packet over the other RAT 202. There may be negotiation between the RATs 200, 202 where such information may be exchanged. This negotiation may take place e.g. when the multi-RAT (inter-RAT) multi-connectivity is being established, for example.

In one embodiment, the timing information may be aligned with PDCP level timing as well as latency based scheduling of the packet duplication over different legs. The timing may relate to how fast the other RAT 202 (e.g. WLAN) is able to transmit the packet. For example, WLAN (WT) can measure the packet transmission time for different attributes including: packet sizes, load, load distribution between high priority (e.g. based on channel quality indicator (CQI) values) and other traffic. WT can further obtain a cumulative distribution function (CDF) of packet transmission time for different values of the attributes (e.g. packet size=100 B, load=10%, high vs. other traffic split=¼). The control node 110 comprising the PDCP entity may then store the packet transmission times CDFs for a set of WLAN loads and packets sizes. The node 110 can be configured with a complete CDF or a set of points of CDF. This may help the node 110 to determine the latencies fast. In one example, assuming 48 Mb/s IEEE 802.11g/a, it may take as low as about 0.1 ms to transmit a small packet and 0.4 ms for a large packet. Provided that the AL 204 may be able to prioritize URLLC traffic over other kinds of traffic such as MBB, and that the 802.11 leg may be dedicated to serving only the controlling first RAT 200 with possible pre-emption of ongoing transmission, the timing and reliability information may then be set depending on different ranges of packet sizes. For example, if packet size<100 bytes=>packet transmission time is 0.1 ms; else if packet size<1000 bytes=>packet transmission time is 0.2 ms; and else if packet size<=1500 bytes=>packet transmission time is 0.4 ms.

The reliability may depend on the load and/or traffic (i.e. congestion) of the other RAT 202. In case the other RAT is applying stop-and-wait (SAW) process, this may affect the expected delay/latency. If the capability information indicates that the requirements of URLLC cannot be met, then the PDCP entity may decide not to rely on the other RAT 202. The reliability information may indicate what the expected reliability for the reception of the data is. Capacity and load may indicate the current traffic situation in the RAT.

In one embodiment, the capability information may be considered in relation to the size of the packet to be transmitted to the UE 120. This is because the size of the packet may have direct impact on the packet transmission time needed for transmitting the packet over a given leg. Examples are provided above for the 802.11 leg 202, and the first RAT leg of LTE or 5G where dynamic scheduling based transmissions with flexible TTIs may occur. Therefore, the size of the packet may impact the scheduling decision and resource allocation.

In one embodiment, as IEEE 802.11 likely may have limited UE multiplexing capability and the packet transmission time may depend on system load, it is proposed that the transmitting PDCP entities of individual URLLC UEs being served by the same nodes 110 and 112 (e.g. located in the node 110 of the first RAT 200) are notified instantly about momentary unsuitability of the other RAT 202 for URLLC. The momentarily/temporal unsuitability of the other RAT 202 may be URLLC-specific. That is, the other RAT 202 may be suitable for transmitting packets in general, but the tight latency requirements of the URLLC may be temporarily unreachable, e.g. due to heavy load in the WLAN. The notification may be initiated by the other RAT 202 and/or by the AL. For example, a new access point (AP) and/or an AdHoc network may appear within vicinity of the other RAT's access node/point 112 which detects higher channel occupancy and determines that the URLLC cannot be supported under such conditions. The notification may be also issued by the AL when the AL sees the number of pending transmissions and recently transmitted URLLC PDCP packet data units (PDUs) from different PDCP entities over a configured time window exceeds a configured limit. This may imply that the tight requirements of URLLC cannot be met at this point of time. The time window and the limit of URLLC PDCP PDUs may be configured based on the quality-of-service (QoS) requirements for the URLLC service and the knowledge about lower-layer capacity and capability of the other RAT 202. For example, the time window can be configured to a value comparable to the required latency of URLLC (0.5 ms), which is reaching a capability limit of the IEEE 802.11 leg. That is, IEEE 802.11 leg is not able to meet the latency requirement for any new URLLC packet in the current time window.

Consequently, the node 110 (e.g. the PDCP entity determining and controlling the packet duplication) may be configured with the capability information comprising at least one of the following: timing and reliability information of the other RAT 202, as functions of provisioned, configured or indicated packet size and load status of the other RAT 202, for transmission of individual PDCP packets over the other RAT 202. Alternatively or in addition to, the node 110 may be aware of lower-layer capabilities and capacity of the at least one other RAT 202 (packet transmission time, packet transmission time variance, CDF of packet transmission times, etc.), status reports regarding success of transmission of past packets, and also possible notification of the momentary unsuitability of the other RAT 202. The node 110 may be configured with such capability information or alternatively receive the capability information from the UE 120 and/or the other RAT 202. The capability information may be received e.g. during a control connection establishment procedure between the controlling first RAT and the other RAT (i.e. during Xw setup procedure). This capability information received over the control connection establishment procedure may include the semistatic information, such as e.g., 802.11 version, maximum bit rates, QoS support capability, etc. In addition to or alternatively, the first RAT 200 may also receive/determine capability information when requesting the packet transmission from the other RAT 202, as shown in step 306 of FIG. 3. This dynamic capability information may have a dynamic nature, which may vary packet-per-packet. Having these capability information, the node 110 may determine which leg(s) of multi-RAT connection it duplicates a given packet and which transmission level, possibly out of a predefined set of transmission levels, to be expected from lower layers of at least the leg of the controlling RAT 200.

Figure 4:
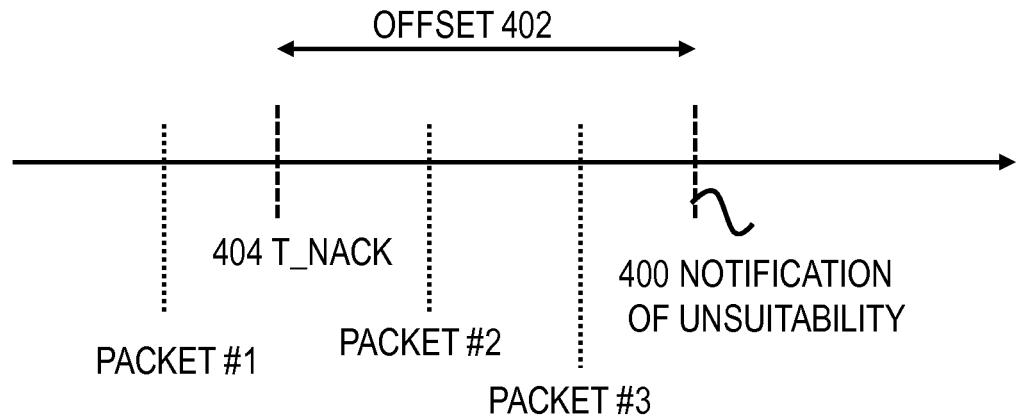
FIG. 4 illustrates an embodiment relating to notification of unsuitability.

In one embodiment relating to the momentary unsuitability/unavailability, as shown in FIG. 4, the node 110 may, in point 400, receive a notification of the momentary unsuitability of the at least one other RAT 202. The suitability may be specific for the request of transmitting the packet according to URLLC requirements. Consequently, the node 110 may consider the notification as proactive negative acknowledgement (NACK) of any packet that has been transmitted via the corresponding at least one other RAT 202 within a predetermined time window preceding the time instant of the notification reception. That is, those transmitting PDCP entities of individual URLLC UEs being served by the same nodes 110 and 112 (e.g. located in the node 110), which sent any packet over the corresponding leg(s) past/after the time t_nack 404 [which is derived from the reception time of the notification (t_notification) and an offset 402 (i.e. t_nack=t_notification−offset) wherein the offset may be a configuration parameter], may consider the notification as NACK for those packets. In this regard, the relevant PDCP entities located in the node 110, shortly referred to as the node 110, shall assume that those packets may be dropped by the AL 204 or the other RAT 202. Based on the notification, the node 110 may decide to retransmit the corresponding packet(s) via the first RAT 200, or via at least one other RAT. For example, let us assume that the node 110 requested a transmission of packets #1, #2, and #3 at the time points as shown in FIG. 4. It can be seen that packets #2 and #3 may be considered to be NACKed since the request and possible transmission of those packets has happened after the time point t_nack 404 from the same RAT which reported monetary unsuitability at time point 400. On the contrary, the request and possible transmission of packet #1 from the same RAT has happened before the time instant t_nack 404. Therefore, packet #1 need not be considered as NACKed, at least not due to this reason.

In case the WT of FIG. 2 operates with multiple modes of adaptive transmission and the PDCP entity in the node 110 of the first RAT 200 is aware of the modes, then the notification of momentary unsuitability may inform the PDCP entity 110 that some of the modes are not suitable for URLLC while other modes are suitable.

As indicated above, there may be an inter-RAT adaptation layer (AL) 204 (FIG. 2) between the other RAT 202 and the controlling RAT 200 (e.g. the first RAT, such as LTE/5G) in the proposed multi-RAT MC RAN system. For example, the AL may be represented by the LWAAP of FIG. 2, when the other RAT 202 is the IEEE 802.11 and the controlling first RAT 200 is the LTE. The AL 204 may be specific to each other RAT, and can be considered as part of lower layers from PDCP perspective. The adaptation layer 204 may in an embodiment be responsible for monitoring and notifying relevant transmitting PDCP entities (e.g. the node 110) about e.g. the momentary unsuitability of the other RAT leg for the URLLC.

The AL 204 of the other RAT 202 may, upon receiving a PDCP packet from the transmitting PDCP entity (e.g. from the node 110), execute transmission of the packet over the other-RAT leg, based on awareness of the corresponding other RAT 202 (provisioned capability and capacity, indicated load status, configured timing and reliability information) and/or indication from the transmitting PDCP of a transmission level to be applied on the packet. The packet transmission by the other RAT 202 may comprise e.g., repetition of the packet, priority handling or pre-emption for the packets against, e.g., ongoing non-URLLC (MBB) traffic. In other words, the AL 204 may decide to repeat the incoming URLLC packet transmission or to override the current data transmission of the other RAT 202 by the incoming URLLC packet transmission, in order to ensure URLLC requirements. The AL 204 may be an actor which can manipulate the incoming traffic over the WLAN 202 based on instruction from the PDCP (or RRC). The WLAN 202 may then transmit the packets according to inputs provided by the AL 204.

Let us take a closer look at the transmission setup/level. In an embodiment, the controlling first RAT 200 is able to support URLLC over the cellular leg with or without availability of other-RAT leg. Because of this, it is expected that the lower layers of the cellular leg should be able to adapt the transmission mode for the PDCP packet of URLLC depending on the availability as well as performance of other RAT 202, in order to optimize radio resource utilization over the cellular leg while meeting the expected QoS requirements. In order to provide this functionality, in an embodiment, the adaptive transmission mode/setup/level of lower layers (e.g. MAC and PHY) is classified into a predefined set of different transmission setups/levels, each represents a certain transmission scheme to be applied on the packet to meet an expected level of latency-reliability requirements.

In an embodiment, the transmission setup defines at least the number of transmissions to be performed for the packet by the first RAT. As said above, the first RAT 200 (e.g. 5G) may apply a control node 110 controlling a plurality of Tx/Rx access nodes. The plurality of transmissions of the same packet (packet repetition) may contribute to the reliability of packet reception. If the capability information of the other RAT 202 indicates that the other RAT 202 (e.g. WLAN) cannot provide as reliable communication to the UE 120 as expected by the control node 110 in providing the URLLC radio bearer service, then the PDCP entity in the node 110 may decide to make repetitive transmissions of the packet to the UE 120 from the first RAT 200. In other words, the node 110 may detect, based on the capability information, that the at least one other RAT 202 is not capable to support a transmission of the packet according to predefined reliability and/or latency requirements, and as a response to the detection, decide to transmit the packet via the first RAT 200 with more robust transmission setup than if the at least one other RAT 202 had been able to transmit the packet according to the predefined reliability and/or latency requirements. The robustness of the transmission may be defied by number of repetitions, robust modulation and coding, diversity transmission or re-transmission procedure, for example. On the other hand, if the reliability and/or latency of the other RAT's 202 communication is of good enough quality (e.g. reliability measured in e.g. block error rate (BLER) and latency below a predetermined level), then the first RAT 200 may suffice without repetition or advanced diversity transmission.

In an embodiment, the determined transmission setup additionally defines at least one of the following: modulation and coding scheme (MCS), retransmission procedure, diversity scenario to be applied by the first RAT 200 for the transmission of the packet to the UE 120. The MCS may vary from QPSK to 64-QAM, for example. Retransmission procedure may be hybrid automatic repeat request (HARQ). Diversity scenario may define how many of the spatially separated Tx/Rx access nodes should transmit the packet substantially simultaneously to the UE 120, or how many antenna ports should participate in the transmission, for example.

In one embodiment, the controlling PDCP entity 110 indicates to the lower layers (MAC and PHY), along with the PDU to be transmitted, which transmission level/setup out of a configured set of pre-defined transmission levels is expected from the lower layer on the packet. As a non-limiting example, three transmission levels may be considered, denoted as transmission level 1 (performance defined by a set of attributes includes at least reliability r1, in time t1), transmission level 2 (reliability r2, in time t2), etc. Depending on the expected gain from the other RAT (IEEE 802.11 taken as an example here), the sending PDCP 110 determines the transmission level expected from the lower layers of the first RAT 200 for the packet. The expected gain may be based on the capability information of the other RAT 202. For example, with low indicated load, the expected gain may be higher than with high indicated load of the WLAN as the other RAT 202.

Figure 5:
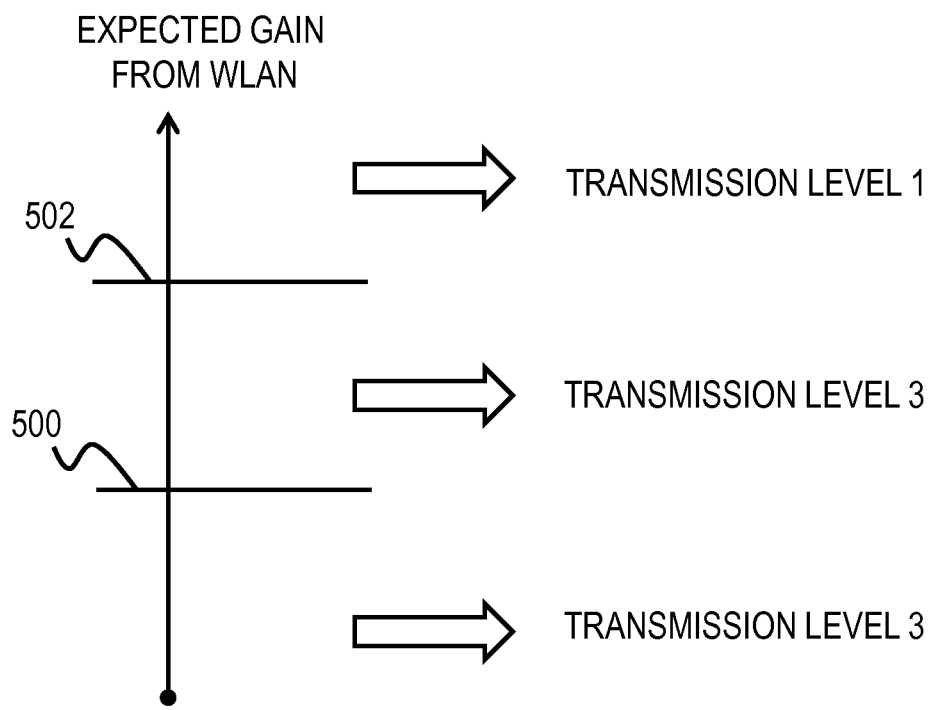
FIG. 5 depicts a selection of a transmission setup, according to some embodiments.

Transmission level 1: In case 802.11 can offer excellent performance gain (for example in case with low load and short packet transmission time, meaning high momentary suitability for URLLC support), the transmission level 1 may use a simple HARQ process with a single transmission and higher MCS to increase spectral efficiency. As shown in FIG. 5, this option may be selected when the expected gain is above a second performance gain threshold 502.

Transmission level 2: This may allow HARQ retransmission and the retransmission can be with strong transmission diversity (e.g. from many Tx/Rx nodes and/or from many antenna ports) and more robust MCS. This option may be applied in case 802.11 can offer well solid and predictable gain (with low load and moderate packet transmission time). As shown in FIG. 5, this option may be selected when the expected gain is below the second performance gain threshold 502 but above a first threshold level 500.

Transmission level 3: This may use strong transmission diversity from the first HARQ transmission, for example multi-site/multi-carrier/multi-node diversity/macro-diversity and with the most robust MCS and micro-diversity since the gain provided by 802.11 is small if not at all or in case 802.11 is not available at all. The transmission diversity can be based on various techniques such as physical layer CoMP, duplication or replication with time-frequency-space diversity together with redundancy combining, use of spatially separated access points (e.g. single frequency network transmission), for example. This option may be applied for example when the packet transmission time offered by 802.11 leg is close to affordable RAN level latency budget or there are many URLLC UEs to be supported over the 802.11 leg. As shown in FIG. 5, this option may be selected when the expected gain from the other RAT 202 is below the first performance gain threshold 500.

The thresholds 500 and 502 may be defined beforehand based on empirical experiments or mathematical modelling. Thus, the threshold values 500 and 502 may be preconfigured to the node 110, for example.

In one embodiment, the controlling/sending PDCP in the node 110, upon receiving the proactive NACK from the AL 204 or WT, may either: (i) select and send a duplication on another cellular leg with the transmission level 3 applied, if available and time allowed; (ii) initiate a repetition of the PDU on the same cellular leg with the transmission level 3 applied or notify the lower layers to change the previous setting on the PDU to the transmission level 3. The latter of (ii) assumes the identity of the ongoing PDU is kept at the lower layers. The lower layers may notify the sending PDCP, if the PDU is already sent successfully and hence no further action needed on the PDU. Otherwise, the lower layers may, for example, renew the HARQ process for the PDU with the transmission level 3 applied. The renewal refers to, for example, the following 2 options: (i) the current HARQ process is restarted for the PDU with a new data indicator; or (ii) keeping the current HARQ process but applying the transmission level 3 right away for the upcoming HARQ retransmission. These help in getting the PDU reliably to the receiving UE 120.

In one embodiment, the AL 204 or the sending PDCP in the node 110 may determine to send once or repeatedly multiple packet duplicates of the same packet over the same leg of the WLAN in time, provided the packet transmission time of the URLLC PDU, corresponding to its size, is a fraction of the latency requirement (around 0.1 ms for example). The replication may be applied when the transmission (duplication) on the cellular leg is using the transmission level 1 or 2, for example. Alternatively, the sending PDCP may determine to send the packet duplicated over multiple legs of a single or of many RATs.

In one embodiment with reference to FIG. 6, the receiving PDCP peer at the UE 120 may optionally report on the received packet duplication, either periodically or event-based. The reporting may be to the controlling first RAT 200, which provides the first leg in FIG. 6. Therefore, the first RAT 200 may receive feedback 600 from the UE 120 regarding reception of the packet. The report 600 may indicate the number of received packets on each leg of at least the first leg and at least one second leg provided the at least one other RAT 202. The number of received packets for all legs may be reported as a packet count for each leg or as a packet count for a reference (master) leg and a difference, e.g., zero, positive or negative deltas, between the reference leg and the reported leg. The reference (master) leg may be the leg of the controlling first RAT 200. The positive delta is for the number of packets the non-3GPP leg receives more than the corresponding 3GPP leg and negative delta is other way around. Based on this report 600, the sending PDCP entity at node 110 may adjust in step 602 at least one of the following: the selection of the at least one other RAT 202 to transmit the packet, the transmission level/setup of the first RAT 200. For example, the selection of the transmission setup on the lower layers (e.g., transmission level 1, 2 or 3) may change, or the node 110 may trigger a reconfiguration of the multi-RAT MC (e.g., adding, replacing, reconfiguring or removing a MC leg). The proposed PDCP level feedback 600 on the received packet duplication herein provides a simple and effective option, instead of using interactions between the lower layers of non-3GPP RAT as the other RAT 202 and the PDCP of the first (3GPP) RAT 200 at the sending end.

In one embodiment, either latency or reliability requirement of URLLC may be relaxed to certain extent. In such cases, the cellular 1st leg may be used as a backup. I.e. when the 802.11 leg reportedly fails to deliver the URLLC packet, the cellular leg is then used for retransmitting the packet. In a further option, the retransmission may be duplicated over the 802.11 leg. This option may be efficient and practical when the packet transmission time of the 802.11 leg is smaller than TTI of the cellular leg. This option may require that the 802.11 MAC indicates ACK/NACK on the MAC packet carrying the PDCP PDU of URLLC to the controlling PDCP 110 via the Xw and the AL 204, for example. This implies that the 802.11 MAC and the AL 204 facilitate mapping between PDCP packet and 802.11 MAC packet. In one implementation option, DL DATA DELIVERY STATUS of Xw application protocol (XwAP) may be enhanced to carry such ACK/NACK bit or bits.

In one embodiment, in which the first transmission attempt carried out using the cellular leg fails, then the PDCP level duplication over the other RAT leg may be attractive option when both the first cellular RAT and the other RAT are operating on licensed spectrum.

In one embodiment, the multi-connectivity may include more than one cellular leg, e.g. 5G-LTE or LTE-LTE or 5G-WLAN-LTE multi-connectivity. In such case, another cellular leg may be based on enhanced LTE, and MAC transmit block (TB) containing the URLLC PDU is transmitted with shorter-TTI of 2/7 OS. Then only the first HARQ transmission may be counted for URLLC due to the assumed longer processing time. In this case, if that MAC TB also contains non-URLLC data and the first HARQ transmission fails, HARQ retransmission may be still carried out for non-URLLC data (URLLC part may then be seen as overhead which can be ignored/dropped at the end of HARQ process by MAC upon mapping logical channel on RB).

Figure 7:
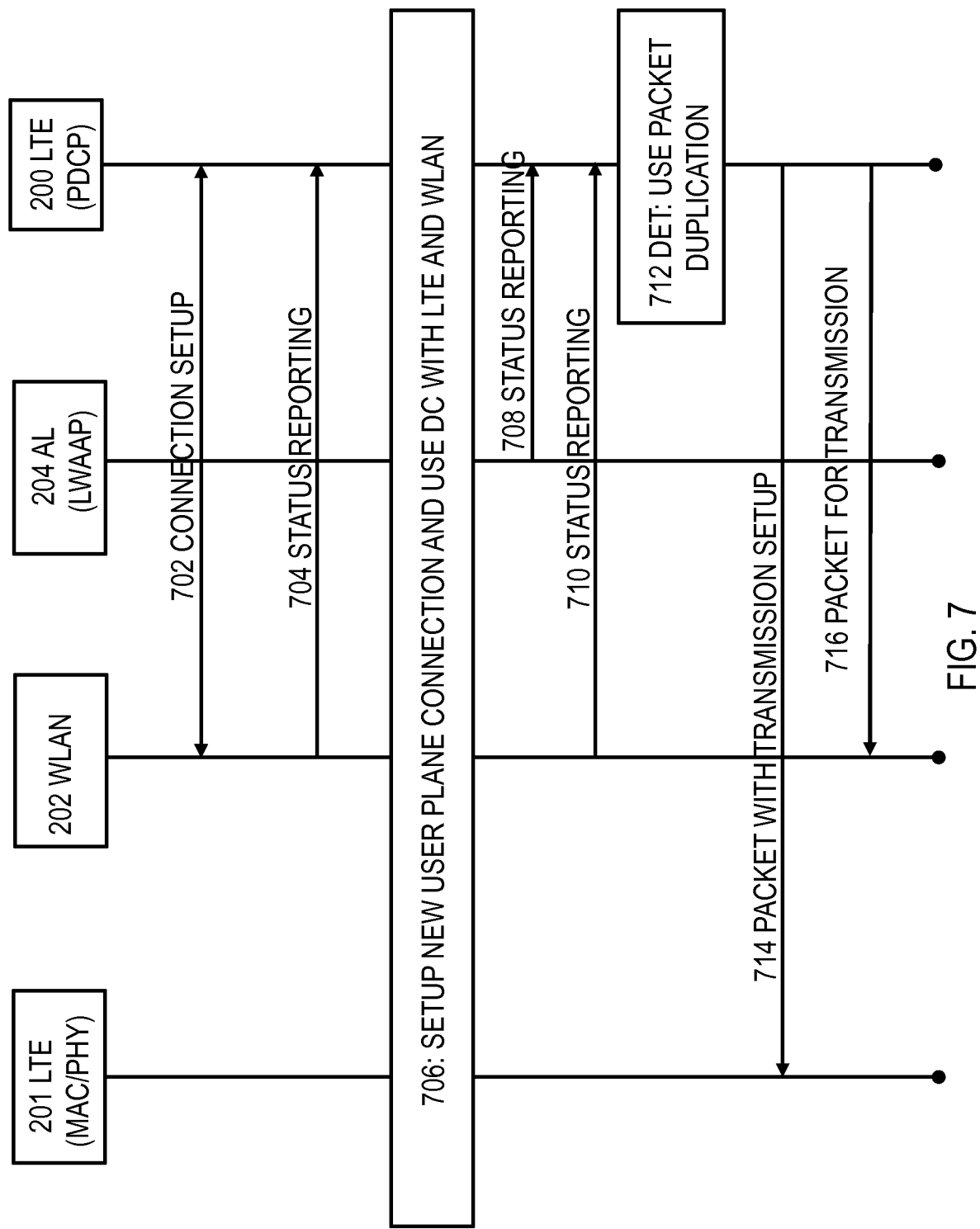
FIGS. 7 and 8 illustrate signaling flow diagrams, according to some embodiments.

FIG. 7 shows an example of the setup procedure of multi-RAT multi-connectivity over 3GPP and non-3GPP RAT and the packet duplication control. The figure shows some interactions between the PDCP entity or the node 110 of the $1^{st}$ RAT 200 (e.g. LTE in this example), $2^{nd}$ RAT 202 (WLAN in this example), $1^{st}$ RAT's lower layers 201 (e.g. PHY and MAC) and the adaptation layer 204 (LWAAP in this LWA example). The signalling between the other RAT 202 and the PDCP or the node 110 implies XwAP signalling between the WT and the controlling eNB of the LTE RAT 200. The signalling between the other RAT 202 and the PDCP may be direct from XwAP or via the AL 204 or via control plane (RRC). However, XwAP may be able to distribute relevant control information to any relevant RAN protocol entities, including the PDCP entity in the node 110 and the AL 204.

In step 702 WLAN 202 and the PDCP entity of the $1^{st}$ RAT 200 perform connection setup. The connection setup may include step 704 in which the WLAN 202 may provide status reporting. In an embodiment, this status reporting may comprise e.g. the semi-static capability information discussed above. The capability information (i.e. the other RAT's 202 capability to serve URLLC traffic) may be associated with a status of WLAN 202. For example, WLAN 202 may provide two sets of capability information (99.9% percentile of transmission time for 500 B size packet) for different loads. Then the status reporting is used to notify the controlling RAT 200 about the load, instead of sending the full set of capability information.

In step 706, the PDCP entity of the $1^{st}$ RAT 200 may setup a new user plane connection and use DC with the LTE 200 and the WLAN 202. In steps 708 and 710 the AL 204 and/or the WLAN 202 may provide further status reports (capability information (semi-static or dynamic), which may include e.g. the notification of momentary unsuitability.

In step 712 it is assumed that the PDCP decides to use packet duplication for this particular packet that needs to be transmitted to the UE according to URLLC requirements. Therefore, the method may continue in step 714 sending the packet to the lower layers 201 for transmission to the UE, along with transmission setup (in case such has been determined based on the previously received capability information in steps 704, 708, 710, for example). The process may also include sending the packet to the WLAN 202 in step 716 for transmission to the UE. Although not shown in FIG. 7, the sending in step 716 may be followed by the WLAN 202 and/or the AL 204 sending dynamic capability information to the first RAT 200, and this may lead to adjustment of the transmission setup of the first RAT 200 (not shown in FIG. 7).

Figure 8:
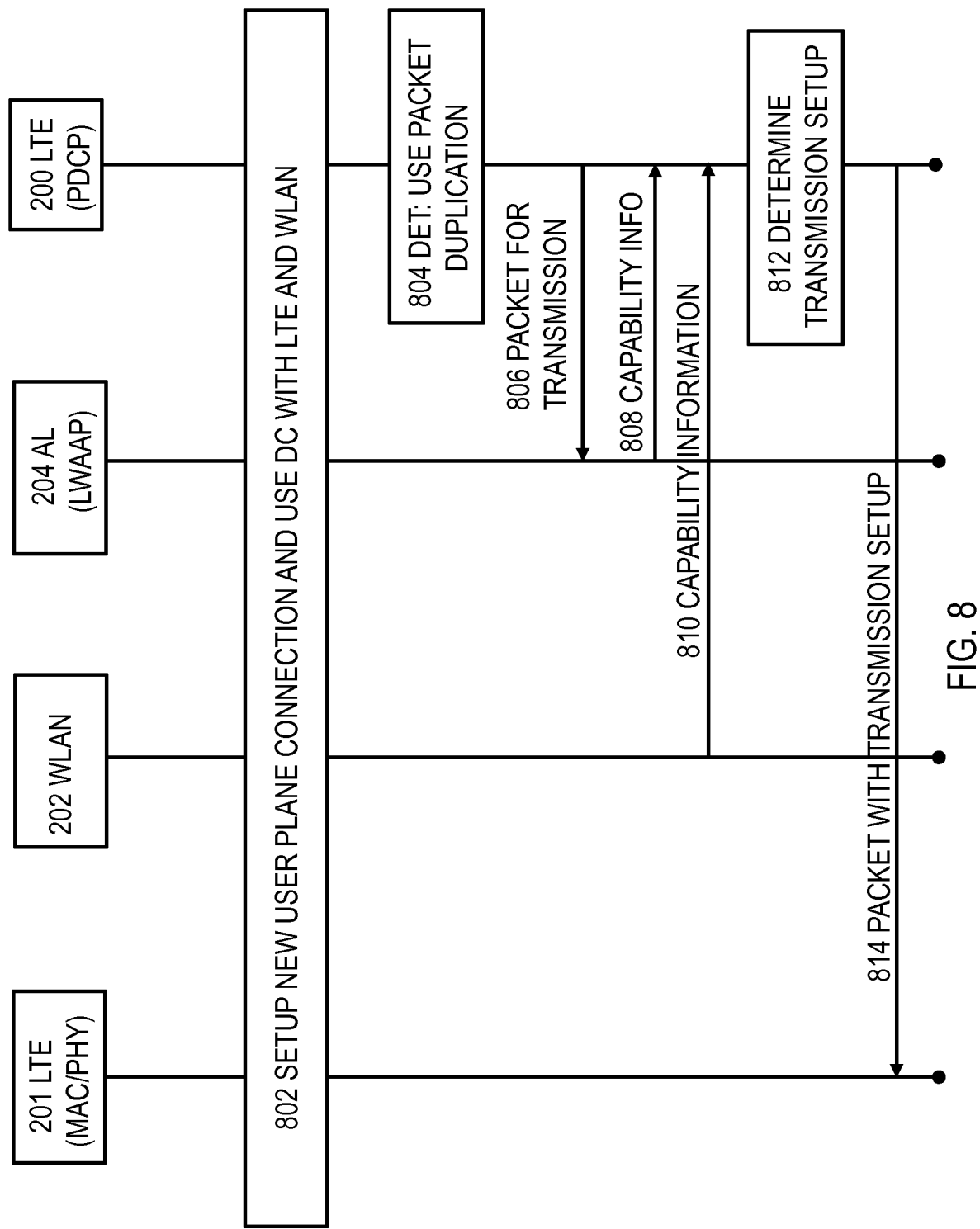

FIG. 8 shows one implementation of the proposal. The figure shows some interactions between the PDCP entity of the 1$^{st}$ RAT 200 (e.g. LTE in this example), 2$^{nd}$ RAT 202 (WLAN in this example), 1$^{st}$ RAT's lower layers 201 and the adaptation layer 204 (LWAAP in this LWA example).

In step 802 the PDCP entity 110 of the first RAT 200 setups a new user plane connection and uses DC with the LTE 200 and the WLAN 202. The connection setup may include the WLAN 202 providing status reporting, such as semi-static capability information, as discussed above. In step 804 the PDCP entity further decides to use packet duplication, possibly due to tight URLLC requirements for the current packet that is to be transmitted to the UE. In step 806 the PDCP requests the transmission of the packet from the WLAN 202 and/or AL 204. The AL 204 and/or WLAN 202 may reply in steps 808 and 810, respectively, with the capability information which may comprise also a notification of a monetary unsuitability, as discussed earlier. In case the WLAN 202 is suitable for accepting the request for this packet, the WLAN 202 or the AL 204 may not need to send the capability information (steps 808 and 810 may be omitted). Based on this capability information or lack of receiving any (as discussed earlier), the PDCP may decide on the transmission level/setup for the lower layers 201 of the first RAT 200 in step 812. In step 814, the PDCP sends the packet to the lower layers 201 along with an indication of the determined transmission setup.

In one embodiment, the determination of duplication in 804 and the determination of transmission setup is step 812 by the controlling RAT 200 may be done at one step, in case the controlling RAT 200 has enough information of the other RAT 202 at the that time (e.g. at step 804). In one embodiment, the transmission setup is changed after initially determining the transmission setup for a give packet. It may be that the controlling decides to duplicate the given packet and send it a) for transmission to the WLAN 202 and b) for transmission to the lower layers of the first RAT 200 with determined transmission setup. Then, the first RAT 200 receives the capability information from the other RAT 202 and adjust the previously set transmission setup, in order to ensure that URLLC requirements are met for the UE 120.

Looking from the other RAT 202 point of view, a method as shown in FIG. 9 may comprise e.g. in step 900 determining, by a network node (for example the node 112 or the AL 204) associated with the second RAT 202, that the second RAT is momentarily unsuitable for transmission of a packet to a user equipment, wherein the second RAT 202 co-operates with the first RAT 200 in a multi-RAT multi-connectivity for transmission of the packet. In step 902, the method may comprise the node transmitting the momentary unsuitability indication to a network node controlling transmissions in a plural of RATs (e.g. to the node 110 of the first RAT 200). The method may also comprise receiving a request from the node 110 controlling transmissions in a plural of RATs, wherein the request is for at least one of the following operations: a transmission of a packet to the UE 120 via the second RAT 202 and an establishment of an inter-RAT multi-connectivity partially via the second RAT 202.

Figure 10:
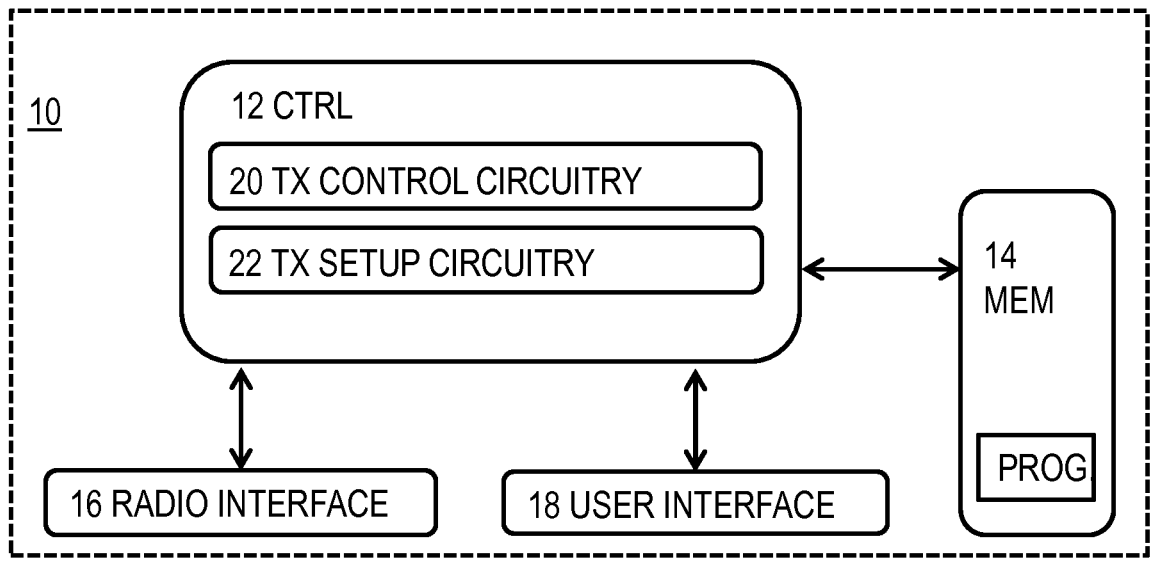
FIGS. 10 and 11 illustrate apparatuses, according to some embodiments.

An embodiment, as shown in FIG. 10, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 10 may comprise controlling PDCP discussed above, such as in a base station (also called a base transceiver station, a Node B, a radio network controller, or an evolved Node B, for example). In an embodiment the apparatus is or is comprised in the eNB 110. Alternatively, the apparatus 10 is comprised in such a device.

The apparatus 10 may further comprise communication interface (TRX) 16 comprising hardware and/or software for realizing communication connectivity according to one or more communication protocols. The TRX may provide the apparatus with communication capabilities to access the radio ac-cess network, for example.

The apparatus 10 may also comprise a user interface 18 comprising, for example, at least one keypad, a microphone, a touch display, a display, a speaker, etc. The user interface may be used to control the apparatus by the user.

The control circuitry 10 may comprise a transmission controlling circuitry 20 for at least partially controlling transmissions in the multi-RAT scenario, according to any of the embodiments. For example the circuitry 10 may perform operations such as deciding to perform packet duplication, requesting transmission from other RAT 202, instructing transmissions in the first RAT 200, to mention only a few non-limiting functions.

The control circuitry 10 may further comprise a transmission setup circuitry 22 for determining a transmission setup/level for transmissions, according to any of the embodiments. The circuitry 10 may also be responsible of fulfilling URLLC requirements. For this, the URLLC requirements may be stored in the memory of the apparatus or indicated from higher layers.

Figure 11:
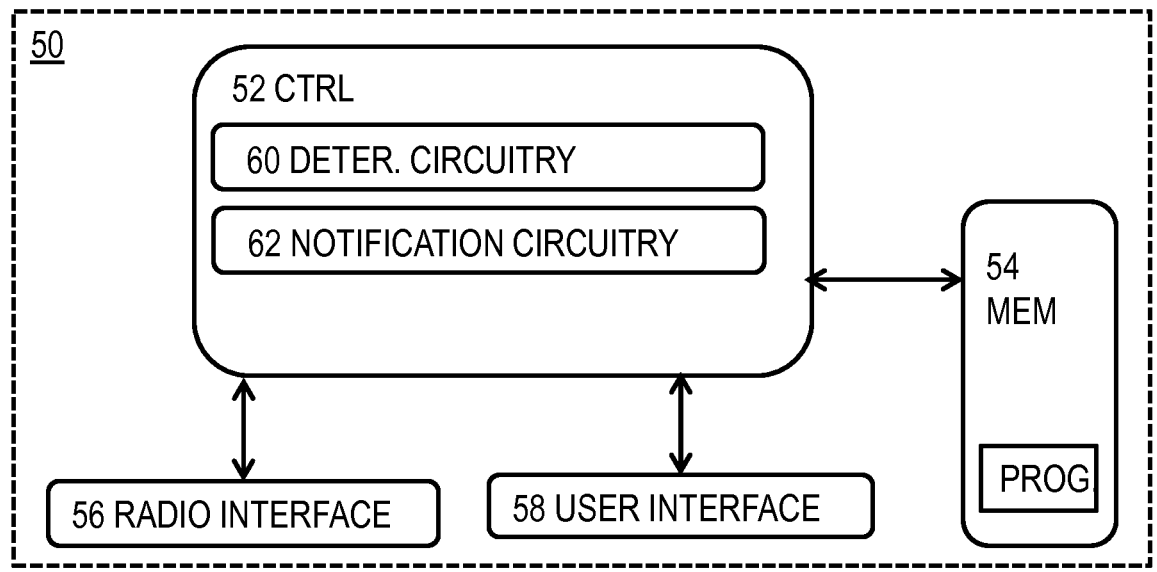

An embodiment, as shown in FIG. 11, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 50 may be or be associated with the second RAT 202, as described above, such as in a WLAN access node or in a network node in-between the RATs in the multi-RAT MC scenario. In the latter case, the apparatus 50 may be a network entity/node comprising the adaptation layer 204. In an embodiment the apparatus is or is comprised in the entity comprising the AL 204.

The apparatus 50 may further comprise communication interface (TRX) 56 comprising hardware and/or software for realizing communication connectivity according to one or more communication protocols. The TRX may provide the apparatus with communication capabilities to access the radio ac-cess network, for example.

The apparatus 50 may also comprise a user interface 58 comprising, for example, at least one keypad, a microphone, a touch display, a display, a speaker, etc. The user interface may be used to control the apparatus by the user.

The control circuitry 52 may comprise a determination circuitry 60 for determining if/when the second RAT is momentarily unsuitable for transmission of a packet to a user equipment, wherein the second RAT co-operates with a first RAT in a multi-RAT multi-connectivity for transmission of the packet. The control circuitry 52 may comprise a notification circuitry 62 for transmitting the momentary unsuitability indication to a network node controlling transmissions in a plural of RATs, such as to the PDCP entity 110.

In an embodiment at least some of the functionalities of each of the apparatuses of FIGS. 10 and 11 may be shared between two physically separate devices forming one operational entity. Therefore, the apparatus (of either FIG. 10 or FIG. 11) may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of net-works, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code may form processing means for carrying out at least some of the embodiments de-scribed. According to yet another embodiment, the apparatus carrying out at least some of the embodiments comprises a circuitry including at least one processor and at least one memory including computer program code. When activated, the circuitry causes the apparatus to perform at least some of the functionalities according to any one of the embodiments described.

According to an aspect, there is provided an apparatus, comprising means for performing at least some of the functionalities according to any one of the embodiments described. According to an aspect of the invention, there is provided an apparatus comprising processing means configured to cause the apparatus to perform at least some of the functionalities according to any one of the embodiments described. According to an aspect, there is provided a computer program product embodied on a distribution medium readable by a computer and comprising program instructions which, when loaded into an apparatus, execute at least some of the functionalities according to any one of the embodiments described. According to an aspect, there is provided a computer program product comprising program instructions which, when loaded into an apparatus, execute at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with Figures may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with Figures may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   at least partially controlling, by a network node, transmissions in a plural of radio access technologies, RATs, each RAT being capable of providing at least one communication link to a same user equipment;
   deciding to transmit a packet to the user equipment at least via a first RAT;
   requesting a transmission of the packet additionally via at least one other RAT;
   determining capability information corresponding to the requested transmission of the packet via the at least one other RAT;
   determining transmission setup for the packet to be transmitted via the first RAT based on the capability information, wherein the transmission setup defines at least the number of transmissions to be performed for the packet by the first RAT; and
   instructing the transmission of the packet via the first RAT according to the determined transmission setup.

2. The method of claim 1, wherein requesting the transmission of the packet additionally via the at least one other RAT comprises sending the packet to the at least one other RAT for transmission to the user equipment.

3. The method of claim 1, wherein determining the capability information comprises receiving the capability information from the at least one other RAT.

4. The method of claim 1, wherein determining the capability information comprises:
   detecting that no capability information is received from the at least one other RAT; and
   determining, based on the detection, that the at least one other RAT is capable of performing the transmission of the packet to the user equipment as requested.

5. The method of claim 1, wherein the capability information indicates information regarding at least one of the following: timing, reliability, capacity, load, momentary suitability status of the at least one other RAT.

6. The method of claim 1, wherein the transmission setup additionally indicates at least one of the following: modulation and coding scheme, retransmission procedure, diversity scenario to be applied by the first RAT for the transmission of the packet to the user equipment.

7. The method of claim 1, further comprising:
   detecting, based on the capability information, that the at least one other RAT is not capable to support a transmission of the packet according to predefined reliability and/or latency requirements; and
   deciding to transmit the packet via the first RAT with more robust transmission setup than if when the at least one other RAT had been able to transmit the packet according to the predefined reliability and/or latency requirements.

8. The method of claim 1, further comprising:
   receiving, as the capability information, a notification of a momentary unsuitability of the at least one other RAT;
   considering the notification as proactive negative acknowledgement of any packet that has been transmitted via the corresponding at least one other RAT within a predetermined time window preceding the time instant of the notification reception; and
   deciding to retransmit the corresponding packet(s).

9. An apparatus, comprising:
   at least one processor and at least one memory including a computer program code, wherein the at least one memory and the computer program code are configured, with the at least one processor, to cause the apparatus to:
   at least partially control transmissions in a plural of radio access technologies, RATs, each RAT being capable of providing at least one communication link to a same user equipment;
   decide to transmit a packet to the user equipment at least via a first RAT;
   request a transmission of the packet additionally via at least one other RAT;
   determine capability information corresponding to the requested transmission of the packet via the at least one other RAT;
   determine transmission setup for the packet to be transmitted via the first RAT based on the capability information, wherein the transmission setup defines at least the number of transmissions to be performed for the packet by the first RAT; and instruct the transmission of the packet via the first RAT according to the determined transmission setup.

10. The apparatus of claim 9, wherein the at least one memory and the computer program code are configured, with the at least one processor, to cause the apparatus further to:

send the packet to the at least one other RAT for transmission to the user equipment.

11. The apparatus of claim 9, wherein the at least one memory and the computer program code are configured, with the at least one processor, to cause the apparatus further to:

receive the capability information from the at least one other RAT.

12. The apparatus of claim 9, wherein the at least one memory and the computer program code are configured, with the at least one processor, to cause the apparatus further to:

detect that no capability information is received from the at least one other RAT; and determine, based on the detection, that the at least one other RAT is capable of performing the transmission of the packet to the user equipment as requested.

13. The apparatus of claim 9, wherein the capability information indicates information regarding at least one of the following: timing, reliability, capacity, load, momentary suitability status of the at least one other RAT.

14. The apparatus of claim 9, wherein the transmission setup additionally indicates at least one of the following: modulation and coding scheme, retransmission procedure, diversity scenario to be applied by the first RAT for the transmission of the packet to the user equipment.

15. The apparatus of claim 9, wherein the at least one memory and the computer program code are configured, with the at least one processor, to cause the apparatus further to:

detect, based on the capability information, that the at least one other RAT is not capable to support a transmission of the packet according to predefined reliability and/or latency requirements; and decide to transmit the packet via the first RAT with more robust transmission setup than if when the at least one other RAT had been able to transmit the packet according to the predefined reliability and/or latency requirements.

16. The apparatus of claim 9, wherein the at least one memory and the computer program code are configured, with the at least one processor, to cause the apparatus further to:

receive, as the capability information, a notification of a momentary unsuitability of the at least one other RAT;

consider the notification as proactive negative acknowledgement of any packet that has been transmitted via the corresponding at least one other RAT within a predetermined time window preceding the time instant of the notification reception; and decide to retransmit the corresponding packet(s).

17. The apparatus of claim 9, wherein the apparatus comprises a packet data convergence protocol layer, PDCP, of the first RAT.

18. The apparatus of claim 9, wherein the first RAT is a cellular RAT and the at least one other RAT operates on an unlicensed spectrum RAT.

19. The apparatus of claim 9, wherein the packet is to be transmitted to the user equipment according to ultra-reliable-low-latency-communications, URLLC, requirements.

20. A non-transitory computer program product embodied on a distribution medium readable by a computer and comprising program instructions which, when executed by an apparatus, cause the apparatus at least to:

at least partially control transmissions in a plural of radio access technologies, RATs, each RAT being capable of providing at least one communication link to a same user equipment;

decide to transmit a packet to the user equipment at least via a first RAT;

request a transmission of the packet additionally via at least one other RAT;

determine capability information corresponding to the requested transmission of the packet via the at least one other RAT;

determine transmission setup for the packet to be transmitted via the first RAT based on the capability information, wherein the transmission setup defines at least the number of transmissions to be performed for the packet by the first RAT; and instruct the transmission of the packet via the first RAT according to the determined transmission setup.

* * * * *